United States Patent [19]
Harmon et al.

[11] 3,887,963
[45] June 10, 1975

[54] CONTROL KNOB ASSEMBLY

[75] Inventors: James E. Harmon, Groton; Stephen R. Watrous, Cortland; Herrick R. Diamond, Homer, all of N.Y.

[73] Assignee: SCM Corporation, New York, N.Y.

[22] Filed: June 19, 1974

[21] Appl. No.: 480,649

[52] U.S. Cl. .................................................. 16/121
[51] Int. Cl. ....... A47b 95/02; B25g 1/00; E05b 1/00
[58] Field of Search ...... 16/110 R, 114 R, 117–121, 16/122, 116

[56] References Cited
UNITED STATES PATENTS 3,427,680  2/1969  Gilbert ............................. 16/121
3,758,920  9/1973  Flagg et al. ...................... 16/121

*Primary Examiner*—Geo. V. Larkin
*Attorney, Agent, or Firm*—Stanley J. Klem; Milton M. Wolson, Esq.

[57] ABSTRACT

A control knob assembly for business machines includes a resilient member having elevated segments disposed along its periphery. The resilient member is positioned within a cylindrical frame and the segments are extended through apertures in the frame to provide a control knob with a soft feel. A retaining member is positioned within the resilient member to hold the resilient member in the assembled position.

17 Claims, 6 Drawing Figures

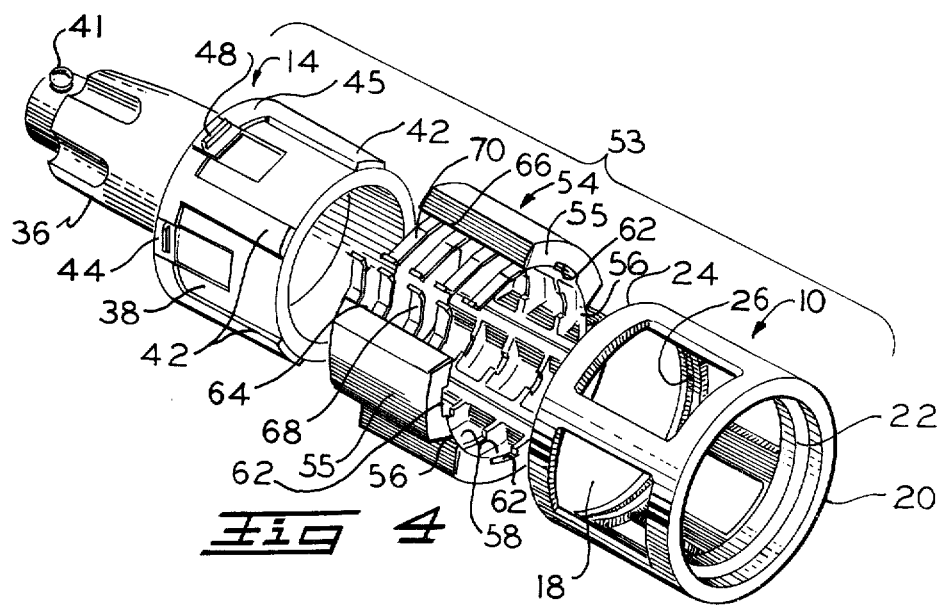
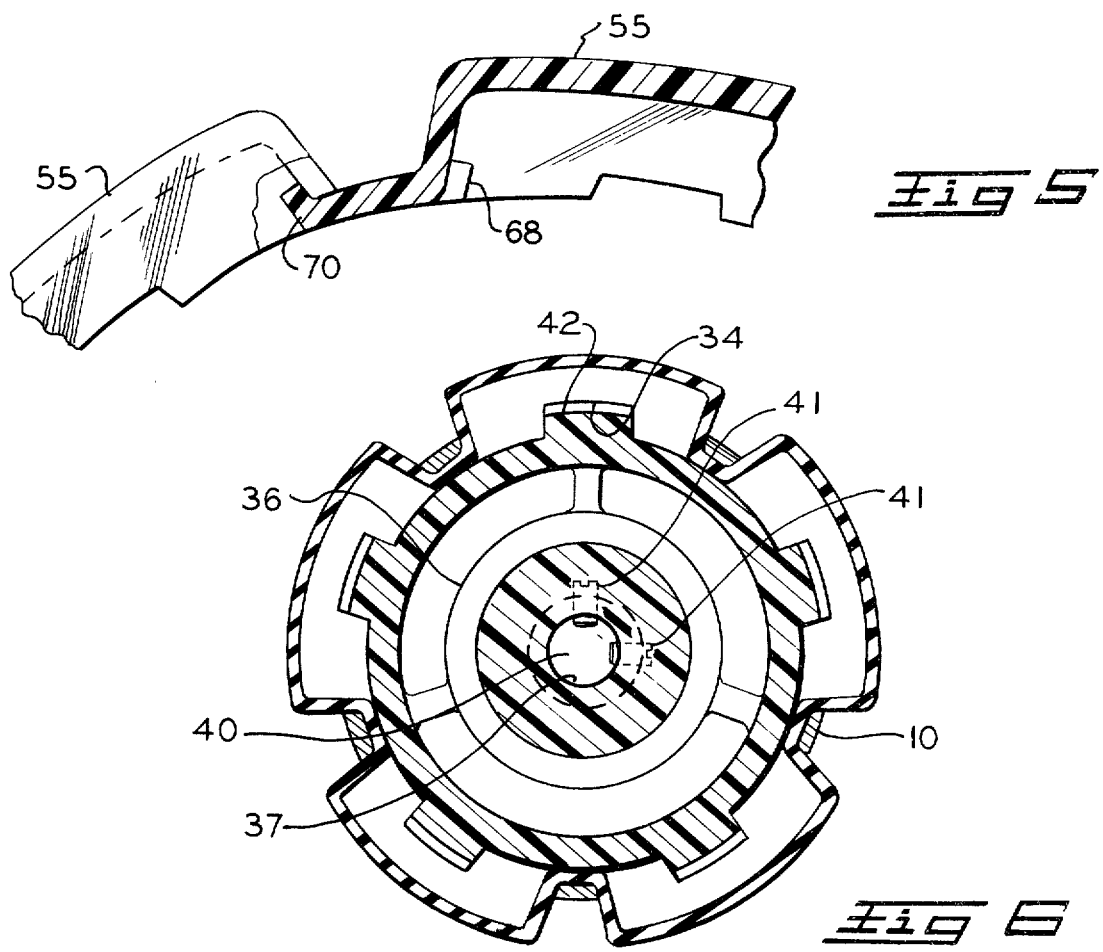

CONTROL KNOB ASSEMBLY

BACKGROUND OF THE INVENTION

Design concepts for control knobs for business machines are predicated by the fact that the knob is easily manipulated by a firm grip on its diameter without slipping; that the knob is comfortable to the feel so that a person's fingers are not irritated or abraded; that the knob is large enough for easy rotation; and that the knob is aesthetically compatible with the equipment on which it is used.

Previous concepts of control knobs, to a great extent, have been limited to one-piece construction that usually was machined or molded. If a knob was machined, its exterior was usually smooth. If the knob exterior was smooth, and the operator's fingers were moist, the operator's fingers often slipped while attempting to rotate the knob. To overcome this slipping, the diameter of the knobs were knurled to allow for a more positive grip. Although this additional machining operation remedied the slipping problem, it was found that the operator's fingers would, in certain instances, become irritated or abraded from frequent rotation of the knob. Certain other knobs were molded from plastic. However, characteristics of the machined knobs were still prevalent in the molded knobs.

Improved prior art concepts included the vulcanizing of rubber sleeves or pads on the metal knob to improve the gripping qualities of the knob. This method of fabricating the knob, although successful, still required machining and close tolerances.

Knobs have been molded of plastic in order to overcome the costly machining operation and attempts to attach rubber gripping pads by vulcanizing have been unsuccessful. Adding rubber to the plastic knob was unsuccessful because the heat required to vulcanize rubber to plastic would destroy the plastic. Therefore, rubber sleeves or pads were attached with adhesive. This method also proved to be costly.

SUMMARY OF THE INVENTION

According to the present invention, a control knob assembly for business machines is disclosed comprising a resilient member having a plurality of elevated segments which are disposed within a plurality of apertures in a cylindrical frame.

A cylindrical retaining member is inserted into an opening defined by the resilient member and the cylindrical frame opening when the resilient member is inserted into the cylindrical frame. The retaining member has ribs disposed along its diameter which cooperate with a plurality of spaced ribs of the resilient member. The retaining member also includes a plurality of flexible latching fingers that engage a groove in the cylindrical frame to lock the retaining member and the cylindrical frame into engagement.

Accordingly, it is an object of the present invention to provide a control knob for office machines that is assembled as an integral unit.

A further object of the present invention is to provide a control knob for office machines that has pads of rubber projecting from its periphery thereby giving the user a control knob that has a soft feel.

Other objects, features, and advantages of the invention will become more apparent from the following description, appended claims, and accompanying drawings.

BRIEF DESCRIPTION OF THE DRAWINGS

FIG. 4 is an exploded perspective view of a second embodiment of the present invention.

FIG. 5 is an enlarged view of a portion of the elongated member of FIG. 4 showing the position of the fingers when they are interlocked.

FIG. 6 is a sectional view through the center of one of the segments of the control knob.

DESCRIPTION OF THE PREFERRED EMBODIMENT

Figure 1:
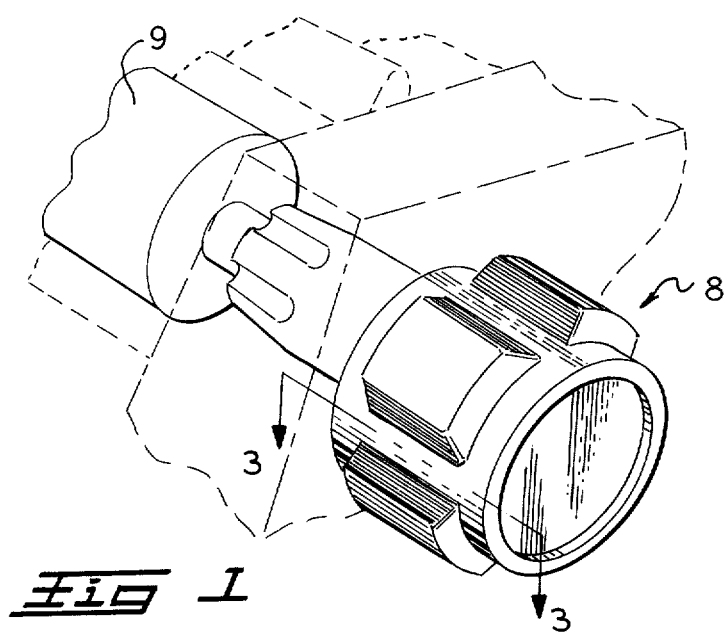
FIG. 1 is a perspective view of the present invention attached to a platen of a business machine.

Referring now to the drawings and in particular to FIG. 1 showing an assembled control knob 8 attached to a platen 9.

Figure 2:
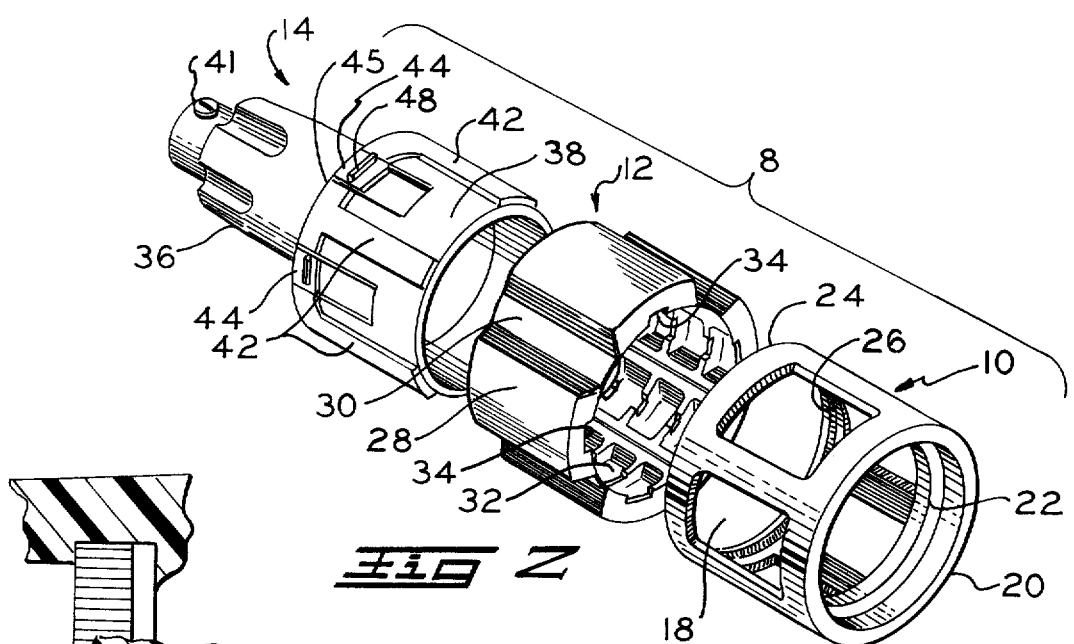
FIG. 2 is an exploded perspective view of one embodiment of the present invention.

In FIG. 2 is shown a first embodiment comprised of a frame 10, an insert 12, and a retaining member 14, all of which, when assembled, comprise the control knob assembly 8 of the present invention.

Frame 10 is an open ended tapered cylinder having a plurality of apertures 18 equally spaced along the frame periphery. One end 20 of frame 10 includes an internal rim 22 whereby end 20 is smaller in diameter than an end 24.

End 24 includes an internal recess 26 spaced from its outermost edge.

Insert 12 is an endless circular member of resilient material, preferably rubber or any other material that will compress. A plurality of elevated segments 28 are equally spaced along the periphery of insert 12 and connected to one another by a plurality of thin walls 30. Segments 28 are in radial alignment with apertures 18 of frame 10. A plurality of cavities 32 within the undersurface of each segment 28 provides each segment 28 with a substantially hollow structure of greater resiliency than a solid structure. Insert 12 is resilient and may be collapsed and inserted into frame 10. A recess 34 extends the length of the underside of each segment 28.

Figure 3:
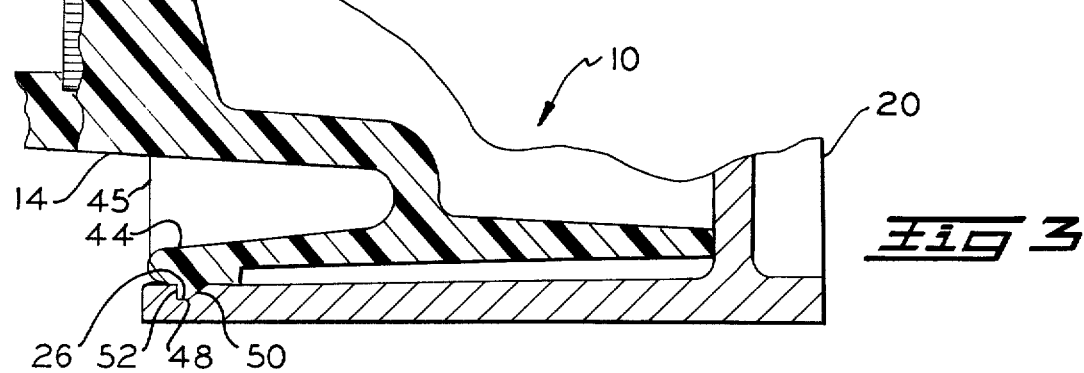
FIG. 3 is an enlarged sectional view as shown in FIG. 1.

Retaining member 14 includes a hub portion 36 and a retaining drum portion 38. Hub portion 36 includes a bore 37 to receive a platen shaft 40. A set screw 41 intersects bore 37 as shown in FIG. 6 to lock hub portion 36 to shaft 40. Drum portion 38 includes a plurality of projecting ribs 42. Ribs 42 are disposed along the length of drum portion 38 for engagement by segment recesses 34 of insert 12 as shown in FIGS. 2 and 6. A plurality of latching fingers 44 are disposed along an edge 45 of drum 38 for engagement with frame recess 26 of frame 10 as shown in FIG. 3. Fingers 44 extend along drum 38 a sufficient distance to impart flexibility in fingers 44. Fingers 44 include an abutment 48. Abutment 48 includes an inclined surface 50 and a substantially vertical surface 52 as best shown in FIG. 3. Inclined surface 50 cams finger 44 radially inward when installing retaining member 14 into frame 10 and vertical surface 52 engages recess 26 of frame 10 to latch retaining member 14 to frame 10.

Control knob 16 may be assembled by manually collapsing insert 12 and urging the collapsed insert 12 into frame end 24. When insert 12 is within frame 10, it is allowed to expand. Simultaneously, segments 28 are oriented into alignment with frame apertures 18. Segments 28 are then seated within apertures 18 as best shown in FIG. 1. Retaining member 14 is then inserted into insert 12 in the following manner. Ribs 42 of retaining member 14 are aligned with recesses 34 of insert 12. Retaining member 12 is then progressively advanced into engagement with insert 12 until inclined abutments 48 of latching fingers 44 engage the end of frame 10. Latching fingers 44 are caused to deflect radially inward until retaining member 14 is seated, at which time latching surface 52 engages recess 26 of frame 10.

Referring now to FIGS. 4 and 5 where a second embodiment of the present invention is disclosed and all parts of a control knob 53 of the second embodiment are alike to the comparable parts of control knob 8 of the first embodiment with the exception of insert 54.

Insert 54 of the second embodiment is an elongated member of resilient material, preferably rubber. A plurality of elevated segments 55 are equally spaced along the length of insert 54 and connected to one another by a plurality of thin walls 56. Segments 55 are spaced in such a manner that they are in radial alignment with apertures 18 of frame 10 when insert 54 is contoured for insertion into frame 10. A plurality of cavities 58 within the undersurface of each segment 55 provides each segment 55 with a substantially hollow structure that is of greater resiliency than a solid structure. Resiliency is a property of insert 54 which is necessary in order that insert 54 may be collapsed and inserted into frame 10. Extending the length of each segment 55 is a recess 62. Each end 64 and 66 of insert 54 terminates in a plurality of locking fingers 68 and 70. Locking fingers 68 on end 64 are disposed in a spaced relationship relative to locking fingers 70 on end 66.

Control knob 53 may be assembled by interlocking insert fingers 68 and 70 to form insert 54 into an endless ring. Insert 54 is manually collapsed and urged into frame end 24. When insert 54 is within frame 10, it is allowed to expand. Simultaneously, segments 55 are oriented into alignment with frame apertures 18. Segments 55 are then seated within apertures 18. Retaining member 14 is then inserted into insert 12 in the following manner. Ribs 42 of retaining member 14 are aligned with recesses 34 of insert 12. Retaining member 14 is then progressively advanced into engagement with insert 12 until inclined abutments 48 of latching fingers 44 engage the end of frame 10. Latching fingers 44 are caused to deflect radially inward until retaining member 14 is seated, at which time latching surface 52 engages recess 26 of frame 10.

While the foregoing description has shown and described the fundamental novel features as applied to a preferred embodiment, it will be understood by those skilled in the art that modifications embodied in various forms may be made without departing from the spirit and scope of the invention.

What is claimed is:

1. A control knob for business machines comprising:
   a frame defining a plurality of apertures disposed along the periphery;
   a member having a plurality of elevated segments disposed for positioning within said plurality of apertures in said frame and to project therefrom when said member is positioned within said frame;
   means for retaining said elevated segments of said member in position within said plurality of apertures in said frame.

2. A control knob as defined in claim 1 wherein said elevated segments are resilient.

3. A control knob as defined in claim 2 wherein said elevated segments are substantially hollow for increasing the resiliency of said segments.

4. A control knob as defined in claim 1 wherein at least one of said elevated segments includes a recess on the underside of said elevated segment and said retaining means includes at least one projecting rib disposed for engagement with said segment recess to prevent movement of said segment member independent of said retaining means.

5. A control knob as defined in claim 4 wherein said segment recess extends the length of the underside of said elevated segment.

6. A control knob as defined in claim 1 wherein said retaining means includes at least one latching member and said frame includes a recess for receiving said latching member for latching said frame to said retaining means.

7. A control knob as defined in claim 6 wherein said latching member includes an abutment, said abutment including an inclined surface for camming said latching member inward when installing said retaining means into said frame and a substantially vertical surface for engaging said recess to latch said frame to said retaining means.

8. A control knob as defined in claim 1 wherein said retaining means includes means for coupling said control knob to the business machine.

9. A control knob for a platen for a business machine comprising:
   a frame defining a plurality of apertures disposed along the periphery thereof;
   an elongated member having a plurality of elevated segments disposed for positioning within said plurality of apertures in said frame and to project therefrom when said elongated member is positioned within said frame;
   means for retaining said elevated segments of said elongated member in position within said plurality of apertures in said frame; and
   means disposed at each end of said elongated member to abut said frame for retaining said elevated segments in said apertures of said frame.

10. A control knob for a platen as defined in claim 9 wherein said elevated segments are resilient.

11. A control knob as defined in claim 9 wherein said elevated segments are substantially hollow for increasing the resiliency of said segments.

12. A control knob as defined in claim 9 wherein at least one of said elevated segments includes a recess on the underside of said elevated segment and said retaining means includes at least one projecting rib disposed for engagement with said segment recess to prevent movement of said elongated member independent of said retaining means.

13. A control knob as defined in claim 12 wherein said segment recess extends the length of the underside of said elevated segments.

14. A control knob as defined in claim 9 wherein said retaining means includes at least one latching member and said frame includes a recess for receiving said latching member for latching said frame to said retaining means.

15. A control knob as defined in claim 14 wherein said latching member includes an abutment, said abutment including an inclined surface for camming said latching member inward when installing said retaining means into said frame and a substantially vertical surface for engaging said recess to latch said frame to said retaining means.

16. A control knob as defined in claim 9 wherein said retaining means includes means for coupling said control knob to the business machine.

17. A control knob as defined in claim 9 wherein said elongated member includes a plurality of spaced fingers at each end of said elongated member for interlocking with one another.

* * * * *